United States Patent [19]
Froberg et al.

[11] 3,967,046
[45] June 29, 1976

[54] APPARATUS AND METHOD FOR INCREASING FURNACE LIFE IN AN ELECTRIC FURNACE FOR THERMOPLASTIC MATERIALS

[75] Inventors: Magnus L. Froberg, Granville; John F. Maddux, Heath, both of Ohio

[73] Assignee: Owens-Corning Fiberglas Corporation, Toledo, Ohio

[22] Filed: Feb. 18, 1975

[21] Appl. No.: 550,809

[52] U.S. Cl. ............................................. 13/6
[51] Int. Cl.² ....................................... C03B 5/02
[58] Field of Search ........................... 13/6, 23

[56] References Cited
UNITED STATES PATENTS

| | | | |
|---|---|---|---|
| 3,395,237 | 7/1968 | Orton | 13/6 |
| 3,417,186 | 12/1968 | Blumenfeld | 13/6 |
| 3,836,689 | 9/1974 | Holler et al. | 13/6 |

*Primary Examiner*—R. N. Envall, Jr.
*Attorney, Agent, or Firm*—John W. Overman; David H. Wilson; Charles F. Schroeder

[57] ABSTRACT

Electrical erosion of refractory in a tank of a furnace for melting thermoplastic materials is reduced by orienting electrodes employed in Joule effect heating of the thermoplastic to limit the current density in the refractory. High electrical resistivity of certain thermoplastics tends to cause a flow of shunted current in relatively low electrical resistivity refractory of the furnace walls during Joule effect heating. Inter electrode spacing and electrode to furnace wall spacing is arranged according to the relative electrical parameters of the furnace system to achieve sufficient Joule effect heating of the thermoplastic without appreciable electrical corrosion. The effects of three phase power sources with various connections is disclosed.

19 Claims, 2 Drawing Figures

APPARATUS AND METHOD FOR INCREASING FURNACE LIFE IN AN ELECTRIC FURNACE FOR THERMOPLASTIC MATERIALS

BACKGROUND OF THE INVENTION

1. Field of the Invention

This invention relates to electric furnaces and to methods of their operation for heating thermoplastic material, particularly molten glass having a relatively high electrical resistivity at molten temperatures.

In the discussion of the invention which follows, particular reference will be made to glass as the exemplary thermoplastic material to be processed in the furnace. However, it is to be understood that other materials having high electrical resistivity at molten state processing temperatures can be processed in apparatus of the type proposed by methods as suggested herein with similar advantages to those attendant the glass processing to be discussed.

2. Description of the Prior Art

The manufacture of glass in large quantities has generally been accomplished by melting and refining the glass constituents in relatively large chambers which have been heated by fossil fuel firing. Environmental considerations and the increasing scarcity of fuel has recently imposed particular emphasis on electrical heating as a means of melting and refining glass. Such heating, particularly where a continuous blanket of unmelted batch is floated on the surface of the molten glass over all or a substantial portion of the free surface of materials constrained by the furnace, results in a savings in heat by virtue of the batch blanket thermal insulating properties, a reduction in the temperature of the gas released to the atmosphere and a reduction in the emission of gaseous constituents from the glass melting and refining process.

In the case of those glasses of relatively low electrical resistivity at their melting and working temperatures such as alkali borosilicate and soda-lime silicate glasses, Joule effect heating wherein current is passed through the molten glass to cause that glass to function as a heating resistance has been utilized effectively. However, glass and other thermoplastic materials having relatively high electrical resistivities at those working temperatures at which they are molten have presented problems which have not been satisfactorily resolved for large scale commercial production.

Particular difficulty has been experienced in attempts to apply Joule effect heating to the production in commercial quantities of the glass composition commonly known as E Glass typically comprising:

| | |
|---|---|
| $SiO_2$ | 54% |
| $Al_2O_3$ | 14% |
| CaO | 17.5% |
| MgO | 4.5% |
| $B_2O_3$ | 10% |

Such glass requires a high temperature for melting and refining, has a relatively high electrical resistivity, and has a relatively steep negative temperature coefficient of electrical resistance.

Refractory materials employed in the receptacles for molten glass in the melting, refining and working of that glass have a useful life which is primarily determined by the rate of loss of the refractory material. The investment involved in construction and rebuilding of such receptacles dictates a requirement for a life of several years for a continuous furnace wherein, in normal operation, batch material is fed and glass is withdrawn on a continuous basis.

A preferred wall material for molten glass receptacles is chromic oxide. Typically E glass is processed in the range from 2400° to about 2750° F. At these temperatures, chromic oxide refractories function satisfactorily over the required furnace life when subjected to a fossil fuel firing. That is, they are mechanically eroded by the glass constituents and are thermally and chemically corroded at rates which are economically tolerable. However, when attempts have been made to heat E glass by Joule effect heating, chromic oxide refractories have been found to deteriorate an excessive rate, unless special precautions are taken.

One means of protecting chromic oxide refractory is disclosed in George R. Machlan U.S. Pat. No. 3,806,621 of Apr. 23, 1974, for "Electric Furnace", wherein at least one side wall and usually all side walls of the melting chamber are formed from a low solubility chromic oxide refractory, and the bottom is formed from a refractory having a high electrical resistance at the temperature of the molten glass, and wherein a plurality of electrodes are positioned in the chamber to at least partially surround one or more cooperating, interconnected electrodes, to limit the maximum potential difference or electrical stress in the side walls as might be imposed by the voltage applied between the electrodes to accomplish the Joule effect heating. The positioning of the interconnected electrodes between the wall and the cooperating electrode or plurality of electrodes provides a fence or guard ring with respect to the potential difference or electrical stresses in the side wall. In one arrangement, the fence or guard electrodes are grounded and the electrode or electrodes which they surround are connected to the hot side of the power source.

A typical refractory offering relatively high electrical resistivity at glass melting temperatures is dense zircon. This material is employed as the furnace bottom in the Machlan patent. While the dense zircon refractory has a substantially higher electrical resistivity than E glass at the temperatures of molten E glass it is subject to rapid deterioration by erosion and corrosion when employed in the side walls of the glass tank.

Heretofore, a number of patent disclosures have presented techniques of limiting the amount of electrical heating which occurs in the molten glass in the vicinity of the side walls of a glass melting receptacle. Cornelius U.S. Pat. Nos. 2,089,689 and 2,089,690 of Aug. 10, 1937 each entitled "Electric Furnace" disclose furnace constructions wherein electrodes pass through the side walls of a glass melting receptacle, or at least have electrically conductive elements contacting those side walls and extending between the source of electrical power and the electrodes in engagement with the glass in the receptacle. Additional patent disclosures which involve the special orientation of electrodes within a glass melting furnace to avoid localized heating of the molten glass in the vicinity of the walls include Romazzotti U.S. Pat. No. 2,267,537 of Dec. 3, 1941 for "Electric Furnace", Borel et al. U.S. Pat. No. 2,552,395 of May 8, 1951 for "Electric Glass Furnace", Lambert U.S. Pat. No. 2,636,913 of Apr. 28, 1953 for "Method and Apparatus for the Manufacture of Glass by Electric Heating" and Penberthy U.S. Pat. No. 3,409,725 of Nov. 5, 1968 for "Furnace Electrode Assembly". While these prior art patents may have been satisfactory with respect to the glass compositions of relatively low electrical resistivity when in the molten state, when compositions of glass having a resistivity in the molten state greater than the resistivity of the containing refractory are processed in their arrangement, an intolerably high rate of refractory deterioration would be experienced, with Joule effect heating. For example, in the case of the Cornelius Patents, the low resistivity side walls would conduct a preponderance of the current resulting from the voltage applied across the electrodes, so that only a minor portion of the current would flow in the glass to produce Joule effect heating. It has been found that current flow in the refractory is a principal cause of refractory deterioration.

Erosion and corrosion are particularly troublesome in interfacial regions. In the case of electrodes for Joule effect heating of glass, the electrodes are attacked intensively at the air-glass, air-batch, and batch-glass interfaces such that electrode life is greatly reduced unless the electrodes are kept free of such interfaces and any oxidizing environments when at elevated temperatures. As disclosed in the aforenoted Machlan patent, the electrodes have been inserted through the furnace bottom to a level below the molten glass upper surface. This was not the case in the Cornelius disclosures and in the other cited patent disclosures, while the electrodes entered the melt below the melt upper surface, the walls through which they passed were not especially chosen to accommodate glass requiring high processing temperatures and having sidewalls of a lower electrical resistivity than the molten glass.

SUMMARY OF THE INVENTION

In accordance with the present invention, relatively high resistivity thermoplastic material is heated while in a molten state and contained in a refractory receptacle having side walls of a material of lower electrical resistivity at the operating temperatures than that of the molten thermoplastic. The electrodes are electrically isolated from the side walls so that conductive paths in those sidewalls are minimized. This electrical isolation is accomplished by the placement of the electrodes.

One arrangement utilizes receptacle side walls of a low solubility refractory material, preferably a chromic oxide refractory, and a bottom of relatively high electrical resistivity refractory material such as zircon through which are extended an array of electrodes, each of which is spaced farther from the side walls of the receptacle than it is spaced from the electrode or electrodes to which its preponderant current flows through the glass. Bottom erosion occurs at a much slower rate than side wall erosion, and therefore the relatively high solubility of the ziron bottom material can be tolerated, particularly inasmuch as the thermal profile vertically through the glass is such that the glass immediately adjacent the bottom wall is of relatively low temperature, and a quiescent layer of molten glass extends over the bottom surface to isolate that surface from the glass currents set up by convection in the body of the molten glass. In the case of E glass, where the chromic oxide refractory has an electrical resistivity of from about 1/10 to about 1/6th of that of the glass in a working temperature range of 2300° to 2700° F. The ziron bottom refractory has a resistivity about 66 times that of the glass at 2300° F to about sixty times that of the glass at 2700° F.

While chromic oxide corrosion is accelerated by the passage of current therethrough, it has been found that the decrease in life of chromic oxide as a suitable glass furnace side wall refractory is within a tolerable level where the current density in the refractory is limited to no more than about two amperes per square inch. Accordingly, the present invention involves placement of the electrodes with respect to the side wall refractory of a material of lower electrical resistivity than the thermoplastic material, such that the resistance of any path for current which includes side wall refractory is great enough, for the voltage applied, to limit that current to a density no more than about two amperes per square inch.

DESCRIPTION OF THE PREFERRED EMBODIMENTS

Figure 1:
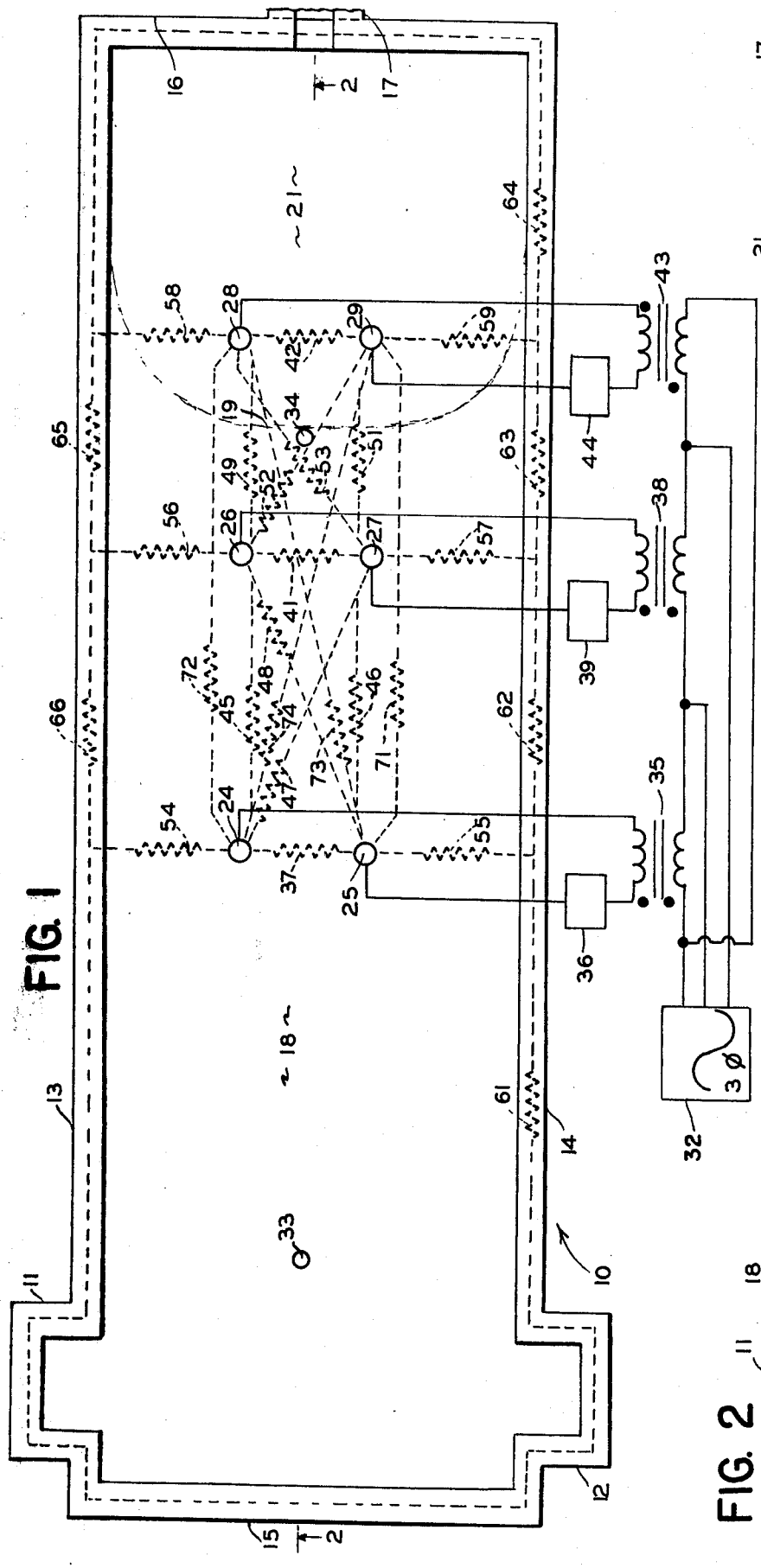
FIG. 1 is a top plan view of an electric furnace for melting glass according to this invention showing a three phase power supply having a phase individual to each of three pairs of electrodes and, in broken lines, the major conductive paths in the furnace sidewalls and in the molten glass.
Figure 2:
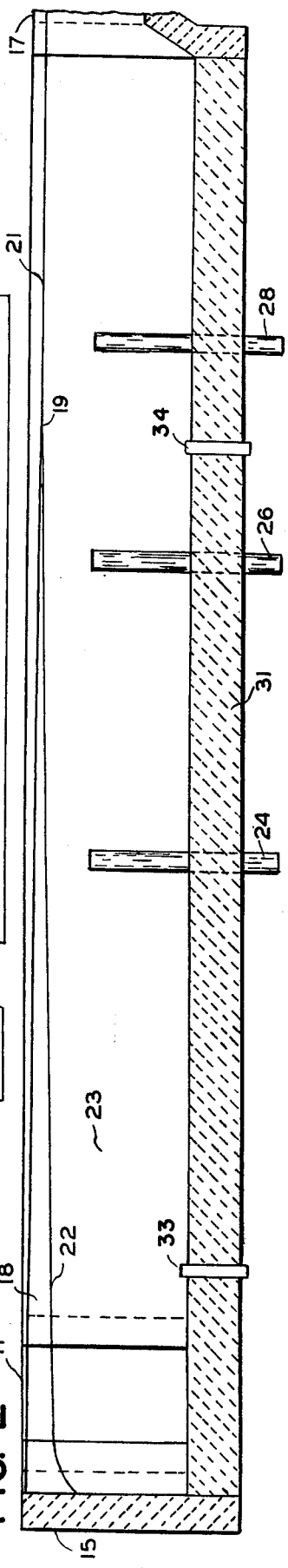
FIG. 2 is a cross-sectional view of the furnace glass tank and throat taken along the line 2—2 of FIG. 1.

The tank portion 10 of a glass melting furnace embodying the invention is shown in plan and side elevation in FIGS. 1 and 2. This furnace can be arranged for Joule effect heating alone, or for Joule effect heating in conjunction with the application of heat above the surface of the constituents contained by the tank. Means for applying heat above the constituents, the crown enclosing the space above the constituents to constrain that heat and direct it upon the constituents, and the flue ports for venting the space to atmosphere have been omitted in the present disclosure in order to emphasize the invention.

Generally, the organization of the batch feeding and above glass heating systems are conventional. That is, as shown in FIGS. 1 and 2, batch is fed at doghouses 11 and 12 in sidewalls 13 and 14 at the rear portion of tank 10 adjacent back wall 15. Batch feeders (not shown), typically of the auger type, are mounted in each doghouse and are arranged to push the batch onto the surface of molten glass so that it floats on a portion or all of that surface. Since batch is of much greater electrical resistance than molten glass, its distribution over the molten glass in tank 10 will not materially affect the electrical considerations regarding this system. Thus the batch might be confined to individual surface areas in the immediate area of the doghouses 11 and 12, it might comprise a blanket extending continuously from side wall 13 to sidewall 14 from the back wall a substantial distance toward the front wall 16 and throat 17 from which molten glass is issued from the tank, or it might cover the entire molten glass mass in the tank. The second alternative is illustrated. Accordingly, a batch layer 18 extends along the length of the furnace from the back wall 15 toward the front wall 16 to a leading edge 19 beyond which the upper exposed surface is molten glass 21. As shown in cross section in FIG. 2 this batch blanket 18 has an interface 22 with underlying molten glass 23 into which it is progressively melted. Such an arrangement includes a crown containing an atmosphere above the blanket 18 and molten surface 21, heaters above the molten surface 21 and a flue port from the crown (none of which is shown) to provide, where the heater is a fossil fuel fired burner, an electric heat-fossil fuel boost type of operation.

This invention pertains particularly to glass tanks for melting and refining glass which has a high resistivity when in the molten state at the melting and refining temperatures. Such a glass is typified by low alkali glasses such as E glass. E glass has a much greater resistivity than glasses commonly heated by Joule effect heating as typified by glasses having relatively high alkali content (in the region of 15% by weight of alkali) such as an alkali borosilicate glass employed to produce glass wool and a much greater resistivity than many refractories suitable for containing molten glass at the glass working temperatures. Thus the Joule effect heating of high resistivity glasses imposes a problem of losses by shunt currents in the refractory which does not exist for low resistivity glasses.

Glasses which have higher electrical resistivities usually require higher melting, refining and working temperatures. Thus the prior recognized adverse effects of increased temperatures on refractories further compounds the adverse electrical effects experienced with high resistivity glasses. Rule of thumb, the refractory wear rate about doubles for each 100° F increase in temperature at glass processing temperatures.

A preferred refractory for glass processed at high temperatures, in the range of 2500° to 2750° F, is chromic oxide so far as wear rate is concerned. The greatest wear is experienced at the glass line, i.e. the molten glass interface with the furnace atmosphere in the case where a free surface of molten glass is exposed to that atmosphere and at the molten glass-batch interface where there is a cover of batch floating on the molten glass. When employed for the side walls of a glass tank in which Joule effect heating of E glass occurs, corrosion of chromic oxide has been found to be a function of the electrical current density in the refractory. A comparison of corrosion rates against corrosion where no electrical current is present at corresponding temperatures of molten E glass, indicates that no significant effect on the corrosion resistance of chromic oxide is observed when a current density of 2 amperes per square inch or less is passed therethrough at the glass line. However, at 2.4 amperes per square inch an increase of the corrosion rate of chromic oxide was about 15%, at 7.3 amperes per square inch a 90% reduction in life was observed and at 8.8 amperes per square inch chromic oxide refractory life was decreased 98%. The underglass corrosion of the chromic oxide was not as great as that noted at the glass line.

Dense zircon (eg. 265 pound per cubic foot) has a much higher electrical resistivity than chromic oxide although its resistance to corrosion is substantially less than chromic oxide. As shown in table I, its electrical resistivity ranges from about a thousand times down to about three hundred times that of the chromic oxide refractory over the temperature range 2100° to 2800° F.

The relative electrical resistivities of chromic oxide, zircon, a typical high alkali glass and a typical E glass for various temperatures in the working range for these glasses is set forth in the table below.

Table 1

| Temperature °F | Resistivity in Ohm — Centimeters | | | |
|---|---|---|---|---|
| | Chromic Oxide Refractory | Zircon Refractory | Alkali-Borosilicate Glass (Wool glass) | High Resistivity Glass (E glass) |
| 2100 | 18.5 | $1.9 \times 10^4$ | 7.2 | $5.6 \times 10^2$ |
| 2200 | 13 | $1.4 \times 10^4$ | 6 | $2.6 \times 10^2$ |
| 2300 | 9.6 | $1 \times 10^4$ | 5 | $1.5 \times 10^2$ |
| 2400 | 7.4 | $6.4 \times 10^3$ | 4.4 | 84 |
| 2500 | 5.8 | $4.3 \times 10^3$ | 3.8 | 53 |
| 2600 | 4.8 | $2.5 \times 10^3$ | 3.4 | 34 |
| 2700 | 4.1 | $1.5 \times 10^3$ | 3.0 | 24 |
| 2800 | 3.6 | $1.1 \times 10^3$ | 2.8 | 17 |

In those instances where Joule effect heating is applied to glasses having a low electrical resistivity relative to the electrical resistivity of the furnace sidewalls at the working temperatures, the electrical conduction path in the sidewalls is negligible. That is, the glass resistance to the passage of electrical current between electrodes in the melt is very low relative to the electrical resistance of circuits including the furnace walls so that most of the current between the electrodes is confined to the molten glass. Thus, Joule effect heating of low resistivity glasses has been accomplished successfully without great concern for the shunt paths in the containing refractory.

High resistivity glass, typified by E glass, has an electrical resistivity substantially greater than the refractories dictated for furnace sidewall utilization by their corrosion and erosion resistance. As a result, electrical potentials developed between electrodes in the glass for Joule effect heating of the glass can cause significant current to flow in the refractory in electrically parallel paths to those current paths in which the Joule effect heating is accomplished.

Generally, it has been assumed that the preponderant Joule effect heating occurs in the vicinity of the electrodes since the greatest current density is present in that region. Accordingly, the tendency in the design of furnaces employing Joule effect heating has been to distribute the electrodes over a substantial portion of the glass volume to distribute the heating and achieve uniform heating. Such distribution resulted in electrodes closely adjacent the furnace walls. While suitable in those instances where the refractory walls were of high electrical resistivity relative to that of the molten glass, such electrode arrays presented relatively low resistance between the electrodes and the walls thereby providing low resistance paths for the current imposed on the glass for Joule effect heating purposes.

A desirable electrode arrangement for Joule effect heating of glass is to pass the conductive connection to the electrode through a furnace wall below the glass line in order that an air-glass or air-batch and batch-glass interface be avoided on the electrode surface. One approach is to mount electrodes vertically through the bottom wall of the tank as shown by electrodes 24 through 29 in bottom 31 of tank 10. Such electrodes are usually isolated from oxidizing materials in their hotter regions to minimize their oxidation. Typically molybdenum electrodes of right circular cylindrical form, three inches in diameter are jacketed in the region below the tank bottom so that they are cooled below about 650°F. at their point of exit from the jacket. Water or air cooling of the jacket can be employed and nitrogen is a suitable non-oxidizing atmosphere around the hotter portions of the electrode in the jacket.

In order to enable the excellent corrosion resistance of chromic oxide to be utilized in electric furnaces without effectively providing a low resistance shunt between electrodes 24 through 29 as they pass through the refractory bottom wall 31 of tank 10, the chromic oxide is employed in the sidewalls and other areas subject to high erosion rates and/or high corrosion rates due to thermal and chemical effects while it is kept remote from the metallic conductors of the heating system. Zircon is employed for the tank bottom 31 to provide high electrical resistivity between electrodes at the working temperatures. Corrosion rates in the furnace bottom are relatively low and thus the zircon paving has a life commensurate with that of the chromic oxide at the sidewall glass line, in the doghouses 11 and 12 and in the throat 17.

Electrical erosion is minimized by maintaining the current in the sidewalls incidental to the Joule effect heating current at or below a density of two amperes per square inch. This is accomplished by proportioning the lengths of the current paths which include portions of the low resistivity side wall to the lengths of the current paths in the relatively high resistivity molten glass for any applied voltage and required current for Joule effect heating so that the wall current is limited to the desired density by the relationships of total resistances of the respective paths.

One example of an electrode arrangement meeting the desired criteria is illustrated by electrode pair 24–25 of FIGS. 1 and 2. Where sidewalls 13 and 14 are chromic oxide at the refractory glass interface and bottom wall 31 is zircon at the refractory glass interface, three inch diameter molybdenum electrodes 24 and 25 extending eighteen inches into molten E glass having an underglass temperature in their vicinity of from about 2540° to 2610° F produce negligible current corrosion in walls 13 and 14 with 320 volts alternating current applied between the electrodes 24 and 25 and 725 amperes flowing in the electrode circuit where the electrodes are spaced 24 inches center to center and centered in a tank of 6 feet 6 inches width. Thus, current paths between the electrodes 23 and 24 are a minimum of 21 inches in length in a material of a resistivity, assuming uniform temperature in the molten glass between of about 34 ohm-centimeters. The calculated resistance between electrodes 23 and 24 is 0.440 ohm.

Electrodes 24 and 25 are spaced from the most proximate sidewalls 13 and 14 respectively 25½ inches. Similar wall-to-electrode minimum spacing and paired electrode spacing is also employed for electrodes 26, 27, 28 and 29. The end pairs of electrodes 24–25 and 28–29 are respectively spaced from the back wall 15 nine feet four and one half inches, and the front wall 16 4 feet 1½ inches, hence, in the consideration of electrical conduction paths to the walls conduction through the glass to the back and front walls will be disregarded and it will be assumed that shunting wall current flows through the glass mass along the shortest path between each electrode and its most proximate wall. Each electrode pair is centered in a plane normal to the longitudinal axis of the furnace with the plane for electrode pair 26–27 spaced 4 feet 6 inches from the plane for pair 24–25 and 3 feet 3 inches from the plane for pair 28–29.

A furnace as illustrated has been operated with a three phase source 32 so that each of the three transformer primaries are supplied by a phase shifted 120° from the other phases and polarization in the secondary of transformer 43 is inverted. Where thermocouples 33 and 34 respectively indicate underglass temperatures of 2540°F and 2610°F and the glass temperature at the entry of throat 17 is 2580°F, Joule effect heating has employed 290 volts at 650 amperes in the circuit to electrodes 24 and 25, 320 volts at 725 amperes in the circuit to electrodes 26 and 27, and 310 volts at 830 amperes in the circuit to electrodes 28 and 29.

In actual practice, the underglass temperature along the longitudinal centerline of the furnace of FIGS. 1 and 2 when processing E Glass will be increasing gradually from the rear wall 15 toward a hot spot approximately two thirds of the length toward the front wall and will then drop in temperature as it approaches the throat 17. Thermocouple 34 is about at the hot spot. The cross furnace thermal profile at 34 will drop the temperature at the glass-sidewall interface to about 2300°F and the temperature at the exterior of the chromic oxide refractory at that cross section is about 2000° F for a drop of about 300° F across the 6 inch thickness of that refractory. Similar gradients will exist at other cross sections along the furnace length.

It will be appreciated that the E glass near the walls will have a resistivity of 150 ohm-cm, or about five times that of the glass between the electrodes even in the region of the hot spot, and that the chromic oxide will have a resistivity at the glass interface of 10 ohm-centimeters and decline to 25 ohm-centimeters at its outer face. The average resistivity of the chromic oxide is approximately fifteen ohm-centimeters. While the fluidity of the glass and the convection currents therein will provide a non linear thermal gradient between the electrodes and side walls which produces other than a straight line temperature or resistivity gradient, it will be appreciated that the lower temperatures in the glass nearer the sidewalls coupled with the logarithmic negative temperature coefficient will cause the resistance of the glass with the wall to electrode spacing greater than the electrode spacing to be several times that between the electrodes.

Power supply 32 is a source of three phase alternating current which supplies power from a respective phase to each pair of electrodes through a transformer and controller. For example, transformer 35 has a primary winding connected to power supply 32 and a secondary winding connected between electrode pair 24 and 25. Current flows between electrodes 24 and 25 through the circuit formed by the secondary winding of transformer 35, controller 36 and the molten glass as represented by the broken line resistor 37. Controller 36 typically may be a saturable reactor or oppositely polarized parallel, silicon controlled rectifiers which are phase controlled to block current flow during selected portions of each voltage cycle which are usually symmetrical for each half cycle. Electrodes 26 and 27 are connected to the secondary winding of transformer 38 and controller 39 with the principal flow path in the glass between electrodes 26 and 27 represented by resistor 41. Similarly electrodes 28 and 29 have a path by resistor 42 supplied by secondary of transformer 43 and controller 44. Each electrode pair can be considered to heat a thermal zone in the glass mass.

Each of electrode pairs 24–25, 26–27 and 28–29 receive power from supply 32 shifted in phase from the two companion pairs so that the instantaneous voltage imposed on all electrodes is different. As a result, current paths in the glass mass must be considered between each of the electrodes. The amount of current which will flow between each pair of electrodes of a different voltage depends upon the phase difference. These current paths are represented by broken line resistor 45 through 49 and 51 through 53. Shunting paths in the glass mass from the electrodes to the furnace sidewalls and through the lengths of sidewall between the junction points with the glass mass resistances, are represented by broken line resistances 54 through 59 for the electrode to wall path portions and 61 through 66 for the wall portions.

Each current path is a function of resistivity of the medium (glass in the melt), cross sectional area and length to determine its resistance and the applied voltage to determine its current magnitude. For ease of illustration of a first approximation of the circuits between electrodes, it will be assumed that the segments of the paths are of magnitudes directly proportional to their lengths when in a given medium. However, it is to be recognized that the thermal and electrical characteristics of glass in an electric furnace do not lend themselves to a simple analysis due to the generally exponential relationship of its negative temperature coefficient of resistance, the temperature variations in a mass of molten glass, layers of molten material adjacent the containing walls of a composition different than the major portion of the mass, and the flow patterns of the molten glass mass. Accordingly, the assumed linear relationship of conductive path length to path resistance is only a first approximation. Further, in the immediate vicinity of the sidewalls, cooler glass has a materially higher resistivity than that between electrodes. The withdrawal of molten glass and the addition of relatively cold batch also distort the thermal profiles and thus the resistivity in the mass.

Considering the current paths of FIG. 1, the spacing of paired electrodes provides the lowest resistance path between those electrodes and this reduced resistance is augmented by the more intense heating in that region. As between electrodes 24 and 25 the lowest resistance is represented at 37. However, a parallel path exists to and through the sidewalls for the potential applied across electrode pair 24–25 as from electrode 24 through the glass mass resistor 54 to sidewall 13, then through parallel paths of the sidewall 13 to backwall 15 and sidewall 14, the resistance of which is represented by resistor 61, glass mass resistor 55 and electrode 25. Another parallel path extends through sidewall 13 forward to front wall 16 and sidewall 14, represented by resistors 66, 65, 64, 63 and 62, and thence through the glass mass represented by resistor 55, to electrode 25. The spacings of electrode 24 from wall 13 and electrode 25 from wall 14 are each greater than the spacing of electrodes 24 and 25. Therefore, the resistance in glass of the path including wall portions is twice the resistance between electrodes even discounting the greater resistivity due to cooler temperatures of glass toward the sidewalls. When this resistance in glass is added to the resistance of the walls, it will be appreciated that with the electrodes 24 and 25 more closely spaced to each other than to the sidewalls and the great length of sidewall involved in the shunt, the path including the walls have a resistance many times that of the glass between electrodes 24 and 25 and thus conducts only a small proportion of the current from the current limited controlled source.

When the other electrode pairs are subjected to power for Joule effect heating, they have similar primary current conduction paths between the electrodes and shunt paths through the refractory walls. In addition, there are paths between electrode pairs as, with the polarities indicated by the dots on the transformer windings, from secondary of transformers 35 and electrode 24 to glass mass diagonal path 47 to electrode 27 through controller 39, secondary of transformer 38, electrode 26, glass mass diagonal path 48, electrode 25, controller 36 and back to secondary 35. This path effectively has the sum of the applied voltages applied as between electrode pairs 24–25 and 26–27. Since the voltages are out of phase the sum of those voltages is a function of the applied individual magnitudes and their phase relationships. The phase difference in voltage on electrode 25 with respect to that on electrode 26 is 120° and is 60° with respect to that on electrode 27. The phase difference in voltage on electrode 24 with respect to that on electrode 27 is 120° and is 60° with respect to that on electrode 26. If both transformers 35 and 38 were supplied by voltages of the same phase the phase differences between two of the electrodes of the different pairs would be zero and between the other two would be 180°. In all but a balanced system such as a two phase supply of equal voltages in quadrature, certain combinations of electrodes from different groups of electrically mated electrodes will have a greater voltage developed across them than other combinations. The mode of connection of the sources to the respective mated electrode groups or pairs will determine the location of the region in the glass to which the greater and lesser interphase voltages and currents will be imposed and will determine the current in the shunt paths including sidewall portions to which those voltages are applied.

Thus in the example of FIG. 1, the phasing imposes the lesser interphase voltages and currents, those due to the 60° phase difference, parallel to the tank sidewalls and between electrodes 25 and 27 adjacent sidewall 14 and electrodes 24 and 26 adjacent sidewall 13. This path is from transformer 35 through electrode 24, glass mass resistance 45, electrode 26, transformer 38, controller 39, electrode 27, glass mass resistance 46, electrode 25, controller 36 and return to transformer 35.

Shunt paths including the furnace walls parallel the aforenoted inter pair paths. However, each path is subjected to twice the glass mass limiting resistance of the paired electrode shunts since each involves the sum of resistances 54, 55, 56 and 57, and each path is subjected to less than twice the paired electrode voltage due to the different phase relationships of the summed voltage. Assuming equal paired electrode voltages applied to each electrode pair, and the controllers 36 and 39 set for conduction throughout the entire cycle of voltage, the sum of the voltages shifted 60° in phase is 1.0 times one paired electrode voltage.

The voltage between electrodes 24 and 26 is 0.50 the voltage of one source and the shunt current in the wall attributable to this voltage essentially is determined by the sum of the resistances 54, 66 and 56. A minor current path paralleling resistance 66 around the furnace wall between the wall regions proximate the electrodes extends through resistances 61, 62, 63, 64 and 65, however it can be disregarded as of much greater value than resistance 66. A higher effective wall resistance can be achieved where the parallel current paths are more nearly equal. Such current is a function of voltage and an inverse function of resistance, the interphase wall currents can be minimized by arranging the higher interphase voltage to be imposed across the higher wall resistance. This is achieved by arranging that interphase voltage for higher summed voltages to be imposed between electrodes on opposite sides of the rectangular array of FIG. 1 so that the parallel wall current paths are more nearly equal in length and thus in resistance.

The above effect is illustrated by the interphase voltages between electrodes 24 and 27 and electrodes 25 and 26 where the 120° difference in phasing imposes $\sqrt{3} = 1.732$ of the individual applied voltages for equal voltages in each phase. This higher interphase voltage is applied to the higher resistance of the nearly balanced sidewall path resistances and the glass mass limiting resistance so that the shunt current for this interphase voltage is minimized.

If the resistance of the wall portions in the several shunt paths is added to the glass mass limiting resistances, it will be appreciated that the currents in the walls will be only a fraction of that between the electrodes and thus only a fraction of the primary Joule effect heating current even for the higher interphase voltages. More particularly, the cooler furnace walls have resistivities at their inner surface temperature of about 2300°F. of about 10 ohm centimeters and at their outer surface of a temperature of about 2000°F. of about 25 ohm centimeters so that the walls augment the limiting resistances of the glass mass.

Adjacent electrode pairs 26–27 and 28–29 illustrate the effect of a shift in phase of 60° in the instantaneous voltage of electrodes adjacent a common sidewall for the assumed 120° phasing of primaries 35, 38 and 43. In this instance the voltage between electrodes 27–29 and 26–28 is $^{1.732}/2$ Vsin ($\omega t + 30°$) where applied voltages are for 27–25 Vsin ($\omega t$) and for 29–28 Vsin ($\omega t - 60°$). This higher voltage across the glass mass resistances and the short wall length, as for electrodes 27–29 through resistances 57, 63 and 59 is the least desirable arrangement from the standpoint of its contribution to wall currents. It should be avoided on a long term basis where the system is operating near a critical sidewall current density, and, under those circumstances employed only when the increased interphase current in the glass mass of resistance paths 51 and 49 is desired temporarily for raising the glass temperature in those regions.

In addition to the primary Joule effect current paths in the glass mass between electrodes of adjacent electrode pairs, there also are such paths for the end pairs 24–25 and 28–29 and consequently shunt currents in the furnace walls due to potentials between those electrodes limited by the electrode to wall resistances of the glass mass and the sidewall resistances. This arrangement increases the interphase voltage across electrodes 26–28 and 25–29 from that realized with 120° phasing along the sidewalls through the greater length of the sidewall paths mitigates against the tendency to develop high currents.

Joule effect heating by currents between end electrode pairs is reduced by the greater glass mass resistance of the longer conduction paths. The longitudinal interphase currents involving the 60° phase difference between the electrodes of pairs 24–25 and 28–29 follow the path controller 36, electrode 25, glass mass resistance 71, electrode 29, controller 44, transformer 43 secondary, electrode 28, glass mass resistance 72, electrode 24, transformer 35 secondary, and back to controller 36. Diagonal Joule effect heating paths involving the 120° phase difference between the electrodes of pairs 24–25 and 28–29 are from controller 36, through electrode 25, diagonal glass mass resistance 73, electrode 28, secondary of transformer 43, controller 44, electrode 29, glass mass resistance 74, electrode 24, transformer 35 secondary, and controller 36.

The shunt currents discussed are cumulative in the sidewalls and, therefore, their cumulative effect must be considered with respect to current density. The aforenoted short current paths in the sidewalls carry the preponderance of the interphase shunt wall currents and are therefore a primary limiting factor where wall current density is the constraint on Joule effect heating. As the electrode pairs are placed closer together along the longitudinal axis of the furnace, the contribution of the sidewall resistance toward limiting interphase currents shunting the longitudinal Joule effect currents is reduced. In the illustrative embodiment electrode pairs 26–27 and 28–29 are more closely spaced longitudinally than are electrode pairs 24–25 and 26–27. Current levels can be reduced in this shunt path of lower resistance by a reduction of the voltage across the shorter path. Thus, a change to a 120° phase shift between longitudinally spaced electrodes 27 and 29 and 26 and 28 materially reduces the currents in this path.

It is advantageous, from the standpoint of avoiding electrical corrosion of furnace sidewalls on a long term operational basis, to arrange the phasing of the several sources so that the mated electrodes of each source are phased with respect to the mated electrodes of the next adjacent source in a manner to impose the greater interphase voltage across those electrodes whose most proximate sidewall portions are spaced the greatest distance along the length of the sidewall to develop the greatest sidewall electrical resistance in the shunt paths subjected to that greater voltage. This suggests that in the example the electrode voltages between electrodes connected to separate sources which are shifted in phase with respect to each other to be coupled as pairs 24–25 and 26–27 so that a 60° difference in phase angle is imposed between those electrodes adjacent a common sidewall and a 120° difference is imposed between those electrodes adjacent opposite sidewalls, for example by reversing the polarity of the voltage applied to electrodes 24–25 at transformer 35.

From the preceding discussion it is evident that the electrical resistance of the molten material is utilized to limit sidewall refractory current density below critically detrimental levels at the requisite applied voltage to achieve Joule effect heating between electrically mated electrodes having portions immersed in the relatively high resistivity molten glass. This effect is realized by employing a current path length in the glass between mated electrodes which is less than the current path from each of the electrodes to its most proximate sidewall portion.

Where a plurality of mated electrode groups are employed with separate sources of voltage applied to each group, as in the rectangular array of electrode groups 54–55, 56–57 and 58–59 the cumulative voltage effects of the several sources are to be considered with respect to shunt currents in the refractory sidewalls. In the case of single phase sources of equal voltage the voltages between certain electrodes of different groups are doubled. In the illustrative three phase supply to three groups phased 120° apart, each with equal voltage applied, the voltages between certain electrodes are 0.866 of the individual voltage and between other electrodes are 0.50 of the individual voltage. Shunt paths in the sidewalls are of maximum resistance for the interphase voltages where the electrodes of the different groups to which the maximum voltage is applied are most proximate refractory sidewall portions which are spaced a maximum distance along the sidewall so that the maximum sidewall resistance is effective to limit the current. Thus, in the rectangular array of electrodes the 120° difference should be between electrodes of different groups on opposite sides of the array as between electrodes 25 and 26 and between electrodes 24 and 27, to achieve the maximum limiting wall current.

It is to be understood that the several shunt current paths are paralleled in the sidewalls and that the total current must therefore be considered with respect to refractory life in sidewalls. Further while the onset of a rather abrupt decline in refractory life for chromic oxide has been observed at about 2.4 amperes per square inch, if a reduced refractory life is tolerable in a furnace campaign, somewhat higher current densities can be imposed. Further where Joule effect heating between electrode groups is utilized and a localized heating is desired, brief intervals of the application of maximum intergroup voltage along one side of the array as between electrodes 27 and 29, while imposing the voltage across the minimum sidewall resistance of resistance 63, is tolerable even if current density tends to exceed the aforenoted limits.

The invention has been disclosed with respect to particular refractories for the tank bottom and sidewalls and a particular glass. It will be appreciated that other combinations of materials having the electrical resistivity relationships with which this invention is concerned can be processed advantageously according to the concepts set forth. Accordingly, it is to be understood that the above description is to be read as illustrative and not in a limiting sense.

We claim:

1. A system for heating molten thermoplastic material by Joule effect comprising a container for the molten thermoplastic material; sidewalls for said container having an electrical resistivity less than the electrical resistivity of such molten thermoplastic material at the operating temperatures of the system; an array of electrodes in said container having portions adapted for contact with such material, certain of said electrodes being mated; and means for applying electrical power to such material through said electrodes for heating such material by the Joule effect, said source being so applied as to impose the greatest voltage across said thermoplastic material between mated electrodes; said electrodes being so positioned with respect to said sidewalls and each other that the mated electrodes having the greatest voltage applied across such thermoplastic material between said electrodes are closer to each other than to the most proximate sidewall.

2. A system according to claim 1 wherein the relationship of the voltage from said applying means to the sum of the electrical resistance between the electrodes and the electrical resistance of said sidewalls limits the current density in the sidewalls below about two amperes per square inch.

3. A system according to claim 2 wherein the molten thermoplastic material to be heated is glass and the material of said sidewalls is chromic oxide.

4. A system according to claim 1 wherein said container has a bottom of a material having a high electrical resistivity with respect to the electrical resistivity of such molten thermoplastic material and said electrodes extend through the bottom of said container to position said portions adapted for contact with such material within said container.

5. A system according to claim 1 wherein said array of electrodes includes a plurality of electrode groups and wherein said means for applying electrical power includes a plurality of individual sources each respectively connected between mated electrodes whereby said sources impose cumulative voltages directly across said thermoplastic and across shunt paths including said thermoplastic and said sidewalls.

6. A system according to claim 5 wherein the sum of said voltages across said shunt paths and the sum of electrical resistance of said thermoplastic material between said electrodes and said sidewalls and the electrical resistance of said sidewalls comprising said shunt paths are so proportioned to limit the current density in the sidewalls below about two amperes per square inch.

7. A system according to claim 5 wherein said sources are connected to the respective mated electrodes to impose the maximum voltages between unmated electrodes on those electrodes so located in the electrode array that the sidewall portions most proximate said unmated electrodes are spaced a greater distance apart along the sidewalls than the sidewall portions most proximate to any other combination of unmated electrodes whereby the sidewall electrical resistance between unmated electrodes contributes a maximum current limiting resistance to the shunt path including said sidewalls.

8. A system according to claim 7 wherein the voltages of said individual sources are of controlled general sine form and are shifted in phase with respect to each other.

9. A system according to claim 8 wherein each set of said mated electrodes is arranged in a ranks, the ranks being aligned in columns and being parallel to each other, and said individual sources are connected to said mated electrodes so that the shift in phase imposes maximum voltages along diagonals between electrodes of said ranks.

10. A furnace for electrically heating a molten thermoplastic material by Joule effect heating within such material, such material having a first level of electrical resistivity at its molten temperature, comprising: a tank for containing such molten material; side walls for said tank of a refractory material of a second level of electrical resistivity which at the molten temperature of the thermoplastic is substantially less than said first level; a first electrode having portions adapted for contact with such thermoplastic material within said tank; a second electrode having portions adapted for contact with such thermoplastic material within said tank; means for applying electrical power to such thermoplastic material through said first and second electrodes for heating such material by the Joule effect; and means for mounting said first and second electrodes with said portions adapted for contact with such thermoplastic material with a spacing between said electrode portions so related to the spacing of each of said electrode portions from said sidewalls that the electrical resistance of the molten thermoplastic material between said electrode portions is less than the electrical resistance of the molten thermoplastic material between each of said electrode portions and said sidewalls.

11. A furnace according to claim 10 including a bottom of refractory material of a third level of electrical resistivity which at the molten temperature of the thermoplastic material is substantially greater than said first level.

12. A furnace according to claim 11 wherein said first and second electrodes extend through said bottom to present said portions for contact with such thermoplastic material.

13. A furnace according to claim 10 including a third electrode having portions adapted for contact with such thermoplastic material within said tank; a fourth electrode having portions adapted for contact with such thermoplastic material within said tank; a second means for applying electrical power to such thermoplastic material through said third and fourth electrodes; and means for mounting said third and fourth electrodes with said portions adapted for contact with such thermoplastic material with a spacing between said third and fourth electrode portions so related to the spacing of each of said third and fourth electrode portions from said sidewalls that the electrical resistance of the molten thermoplastic material between said third and fourth electrode portions is less than the electrical resistance of the molten thermoplastic material between each of said third and fourth electrode portions and said sidewalls.

14. A furnace according to claim 13 wherein said first and second means for applying electrical power are connected respectively to said first and second electrode portions and to said third and fourth electrode portions so that the sidewall portions most proximate the respective electrode portions connected to said first and second means which have the greatest potential therebetween have a longer length of sidewall therebetween than the sidewall portions most proximate the respective electrode portions connected to said first and second means which have the least potential therebetween.

15. A furnace according to claim 13 including a fifth electrode having portions adapted for contact with such thermoplastic material within said tank; a sixth electrode having portions adapted for contact with such thermoplastic material within said tank; a third means for applying electrical power to such thermoplastic material through said fifth and sixth electrodes; said first and second electrode portions being more proximate said third and fourth electrode portions than said fifth and sixth electrode portions; means for mounting said fifth and sixth electrodes with said portions adapted for contact with such thermoplastic material with a spacing between said fifth and sixth electrode portions so related to the spacing of each of said fifth and sixth electrode portions from said sidewalls that the electrical resistance of the molten thermoplastic material between said fifth and sixth electrode portions is less than the electrical resistance of the molten thermoplastic material between each of said fifth and sixth electrode portions and said sidewalls; and said means for applying electrical power are connected to their respective electrodes such that the sidewall portions most proximate the respective most proximate electrode portions connected to said different means which have the greatest potential therebetween have a longer length of sidewall therebetween than the sidewall portions most proximate the respective electrode portions connected to said means which have the least potential therebetween.

16. The method of heating molten thermoplastic material by the Joule effect in a tank having refractory sidwalls, wherein such thermpolastic material has an electrical resistivity exceeding the electrical resistivity of such refractory at the heating temperature comprising:
contacting such molten thermoplastic material with mated electrodes; applying sufficient voltage between mated electrodes to develop the desired Joule effect heating in such molten thermoplastic material; and
establishing a resistance in such molten thermoplastic material between each electrode and the sidewalls which is greater than the resistance in such thermoplastic material between the mated electrodes to limit the shunt current which flows in the sidewalls between mated electrodes.

17. The method according to claim 16 including the steps of contacting such molten thermoplastic material with a plurality of groups of mated electrodes;
applying sufficient voltage between mated electrodes from sources individual to different groups to develop the desired Joule effect heating in such molten thermoplastic material; and
establishing a resistance in such molten thermoplastic material between each electrode and the sidewalls which is greater than the resistance in such thermoplastic material between the mated electrodes to limit the shunt current which flows in the sidewalls between electrodes.

18. The method according to claim 17 wherein the individual sources of voltage are shifted in phase with respect to each other including: the step of applying the sources so that the maximum voltage difference between electrodes of the most proximate electrode groups is between electrodes of those groups which are most proximate sidewall regions having the greatest spacing along the sidewalls whereby the sidewall electrical resistance between those electrodes having maximum voltage therebetween is greater than the sidewall electrical resistance between sidewall regions most proximte other electrodes of those groups.

19. The method according to claim 17 including the step of positioning electrode groups transverse of the major axis of a rectangular array of electrodes; feeding material to be melted into the molten thermoplastic from a position beyond one end of said electrode array along its major axis; and withdrawing molten thermoplastic from a position beyond a second end of the electrode array along its major axis.

* * * * *